May 12, 1953  C. W. GRAY  2,638,194
SAFETY BRAKE FOR VEHICLES
Filed Jan. 11, 1949  6 Sheets-Sheet 1
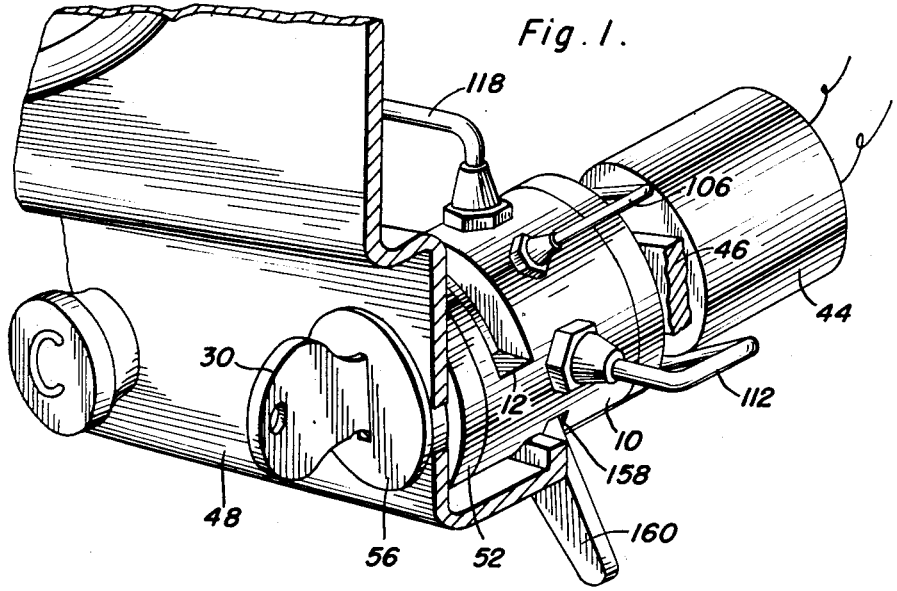
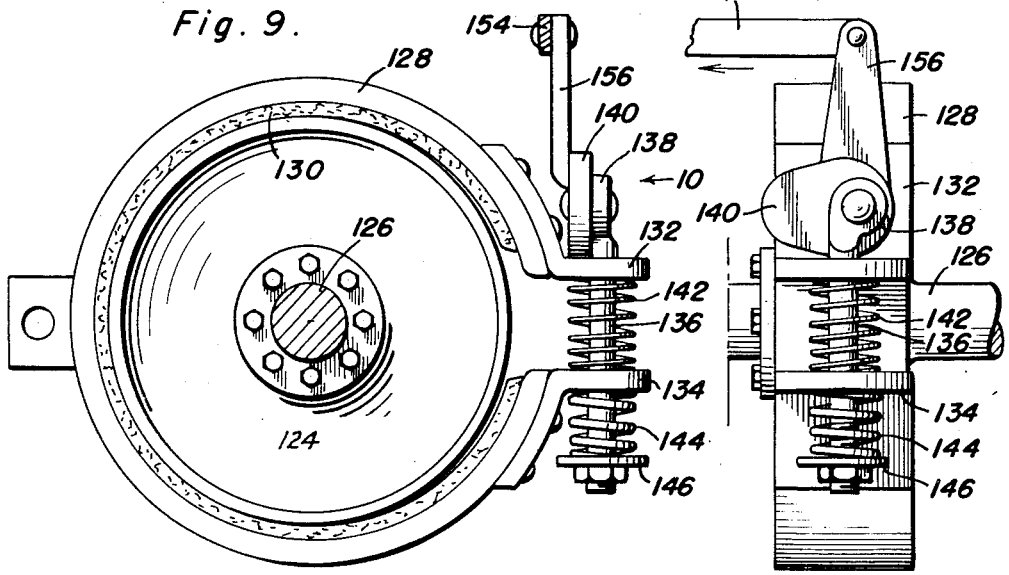
Claud W. Gray
INVENTOR.
BY *Clarence A. O'Brien*
*and Harvey B. Jacobson*
Attorneys Claud W. Gray
INVENTOR.

Claud W. Gray
INVENTOR.

May 12, 1953  C. W. GRAY  2,638,194
SAFETY BRAKE FOR VEHICLES
Filed Jan. 11, 1949  6 Sheets-Sheet 4

Claud W. Gray
INVENTOR.

May 12, 1953  C. W. GRAY  2,638,194
SAFETY BRAKE FOR VEHICLES
Filed Jan. 11, 1949  6 Sheets-Sheet 5
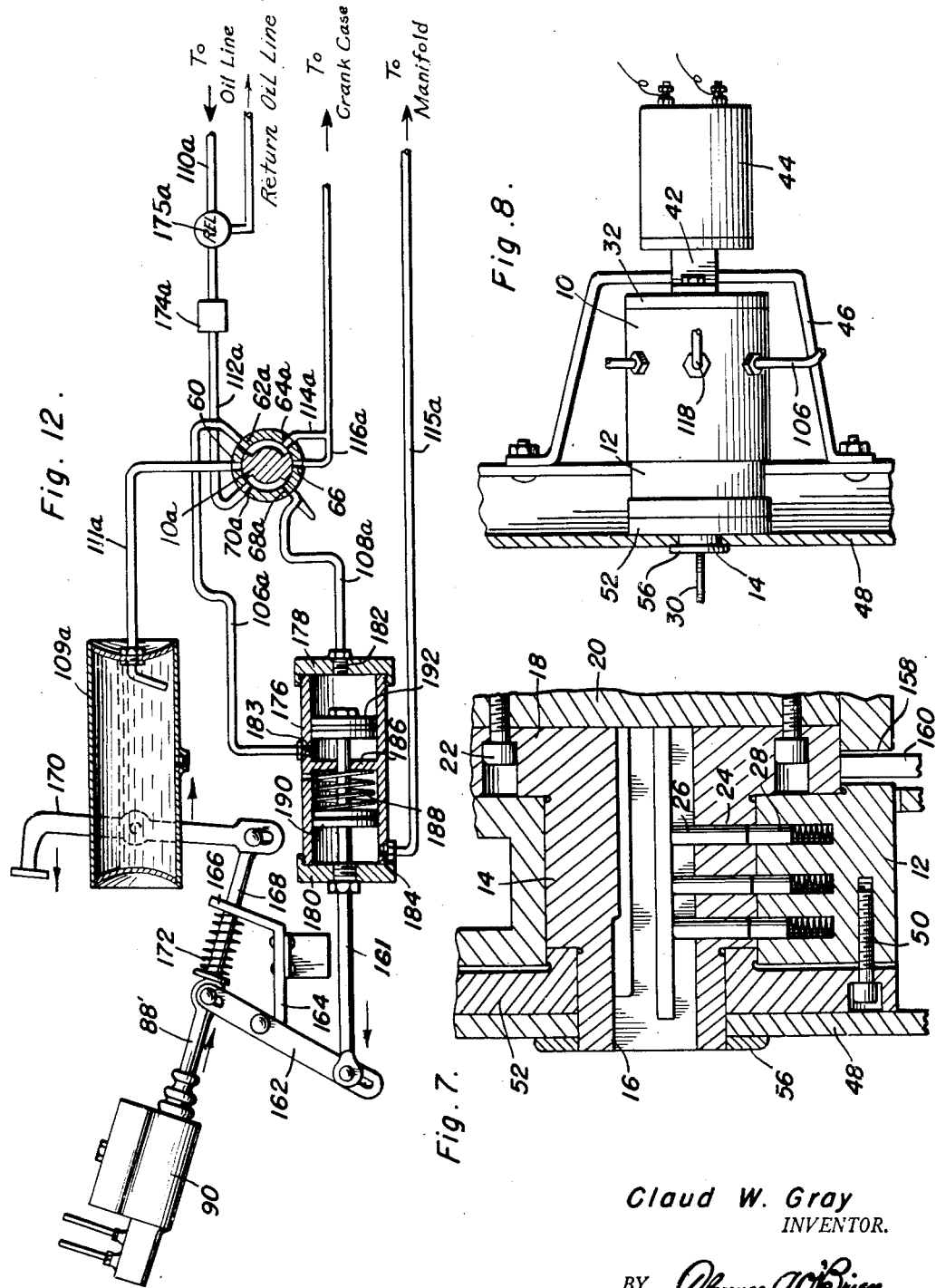
Claud W. Gray
INVENTOR.
BY Clarence A. O'Brien
and Harvey B. Jacobson
Attorneys May 12, 1953
C. W. GRAY
2,638,194
SAFETY BRAKE FOR VEHICLES
Filed Jan. 11, 1949
6 Sheets-Sheet 6
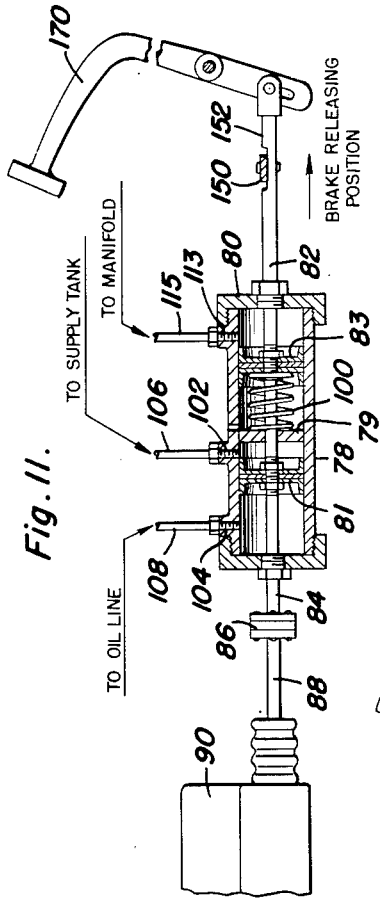
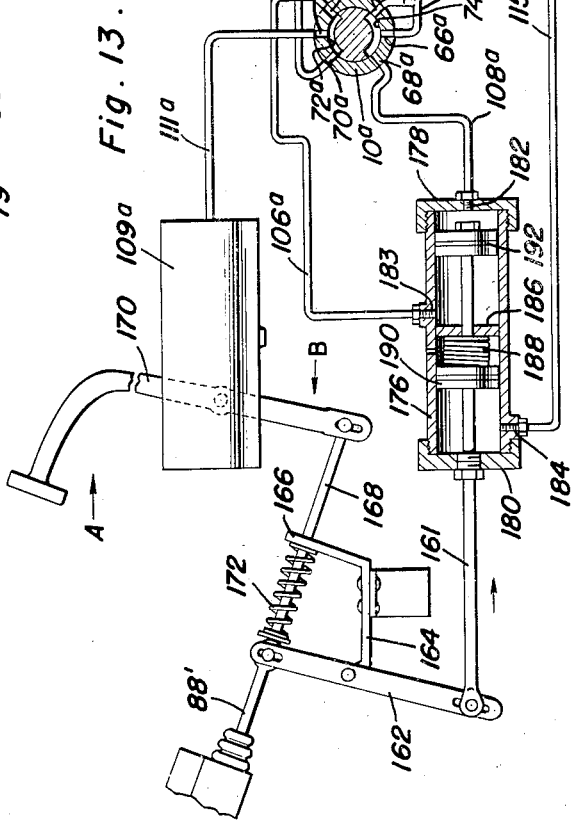
Claud W. Gray
INVENTOR.
BY Clarence A. O'Brien
and Harvey B. Jacobson
Attorneys Patented May 12, 1953

2,638,194

UNITED STATES PATENT OFFICE 2,638,194

SAFETY BRAKE FOR VEHICLES

Claud W. Gray, San Bernardino, Calif.

Application January 11, 1949, Serial No. 70,224

15 Claims. (Cl. 192—3)

This invention relates to new and useful improvements in vehicle brake mechanisms and the primary object of the present invention is to provide a fluid brake operated by the power plant of a vehicle and which is automatically actuated to a braking position when the power plant of the vehicle is inoperative, to prevent unauthorized use of a vehicle.

Another important object of the present invention is to provide a mechanical brake for the driving shaft of a vehicle and embodying novel and improved means for simultaneously activating the brake and the brake rod for the master cylinder of the vehicle braking system when the power plant of the vehicle is inoperative, thus permitting the present construction to be employed as an emergency brake as well as an anti-theft brake.

A further object of the present invention is to provide a safety, hydraulically operated brake for vehicles including a novel and improved valve that is operated by the ignition switch of the vehicle.

Another feature of the present invention is to provide a safety brake for vehicles that is quickly and readily applied to or removed from the conventional braking system of a vehicle in a convenient manner.

A still further aim of the present invention is to provide an anti-theft brake for vehicles that is simple and practical in construction, strong and reliable in use, small and compact in structure, efficient and durable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary perspective view of a vehicle dashboard and showing the manner in which the present valve housing is applied to the ignition switch;

Figure 7 is a fragmentary longitudinal vertical sectional view showing the barrel rotated to an unlocked position;

Figure 8 is a top plan view of Figure 1;

Figure 9 is a rear elevational view of the mechanical brake used in conjunction with the present invention and showing the vehicle driving shaft in cross-section;

Figure 10 is a side elevational view of Figure 9 taken substantially in the direction of arrow numbered 10 in Figure 9;

Figure 11 is an enlarged fragmentary view showing the manner in which the brake rod is connected to the hydraulically operated piston;

Figure 12 is a diagrammatic view showing the present invention in modified construction applied to the master cylinder with the brake in its released position; and Figure 13 is a diagrammatic view similar to Figure 12 and showing the brake applied.

Figure 2:
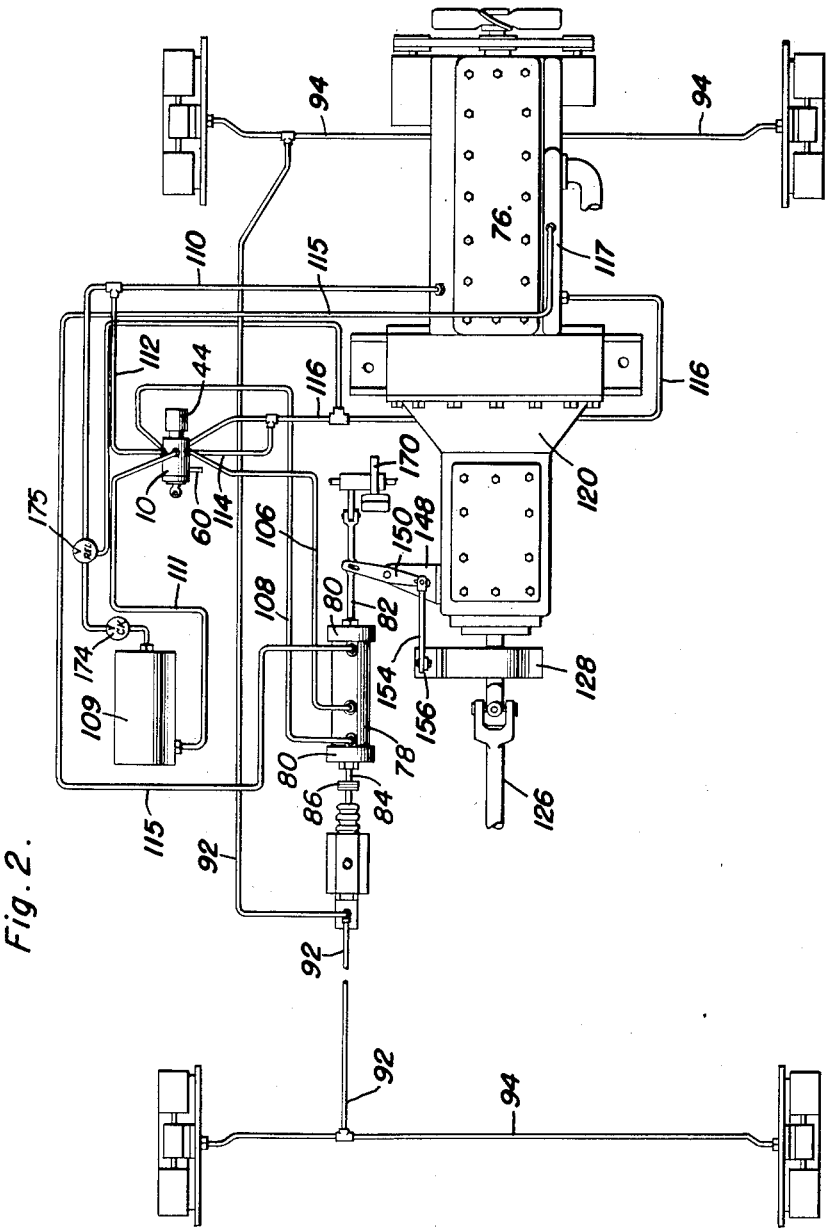
Figure 2 is a diagrammatic view showing the present invention applied to a vehicle.
Figure 3:
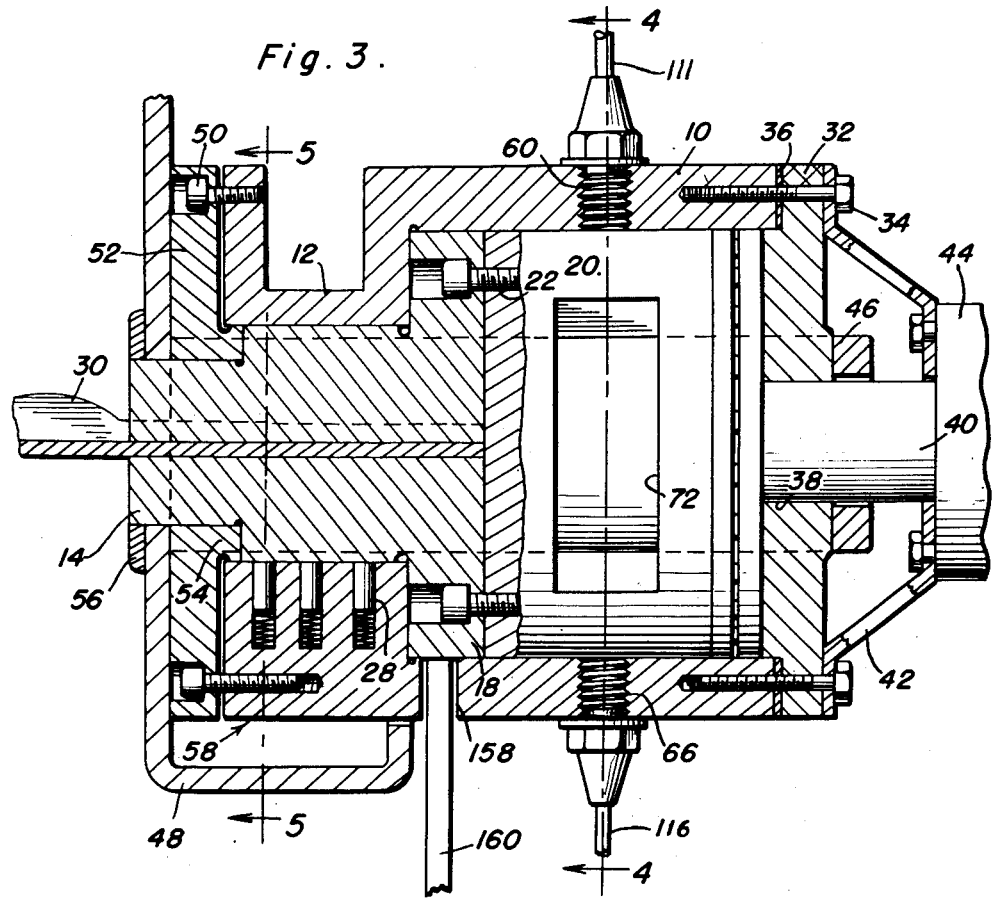
Figure 3 is a longitudinal vertical sectional view of the present valve housing and the ignition switch associated therewith and showing the valve partly in elevation, taken substantially on the plane of section line 3—3 of Figure 4.

Referring now to the drawings in detail, wherein for the purpose of illustration, there is disclosed a preferred embodiment of the present invention, the numeral 10 represents a substantially cylindrical housing having a reduced extension 12 at one end in which there is rotatably mounted a barrel 14 having a key slot 16.

The barrel 14 is provided with an enlarged end portion 18 that is positioned within the housing 10 and which is removably secured to a cylindrical valve 20, mounted in the housing 10 for rotation, by fasteners or the like 22.

The barrel 14 and extension 12 are formed with spaced parallel bores or seats 24 for complemental pairs of spring urged tumblers 26 and 28 which are arranged in such a manner as to permit the joining surfaces of the tumblers 26 and 28 to be disposed at the juncture of the barrel 14 with the extension 12 when the proper key 30 is positioned in the slot 16 to permit rotation of the barrel 14 relative to the extension 12 and hence rotation of the valve 20 in the housing 10 in a conventional manner.

A retaining plate 32 is removably secured to the inner open end of the housing 10 by fasteners 34 and a sealing gasket 36 is interposed between the plate 32 and the open inner end of the housing 10.

The plate 32 is formed with a central opening 38 that rotatably receives a rotor 40 which is rotated by the valve 20.

Supported relative to the plate 32 by brackets 42 is an electrical coil and ignition switch 44 that is operated by the rotor 40 and which is operatively connected to the ignition circuit of a vehicle.

To further support and retain the rotor in position, there is provided a further group of brackets or a U-shaped bracket 46 having its end portions secured to the vehicle dash panel 48 and its web portion apertured to receive the said rotor.

Removably secured to the extension 12, or the outer face of the extension 12, by fasteners 50, is a holding ring 52 having an enlarged hub portion 54 that rotatably supports the barrel 14. The ring 52 bears against the inner face of the dash panel 48 and cooperates with the flange 56 at the outer end of the barrel 14 in order to retain the locking mechanism 58 positioned relative to the dash panel.

The housing 10 is provided with a plurality of circumferentially spaced internally threaded ports which are indicated by the numerals 60, 62, 64, 66, 68 and 70 for a purpose that will later be more fully described.

Figure 4:
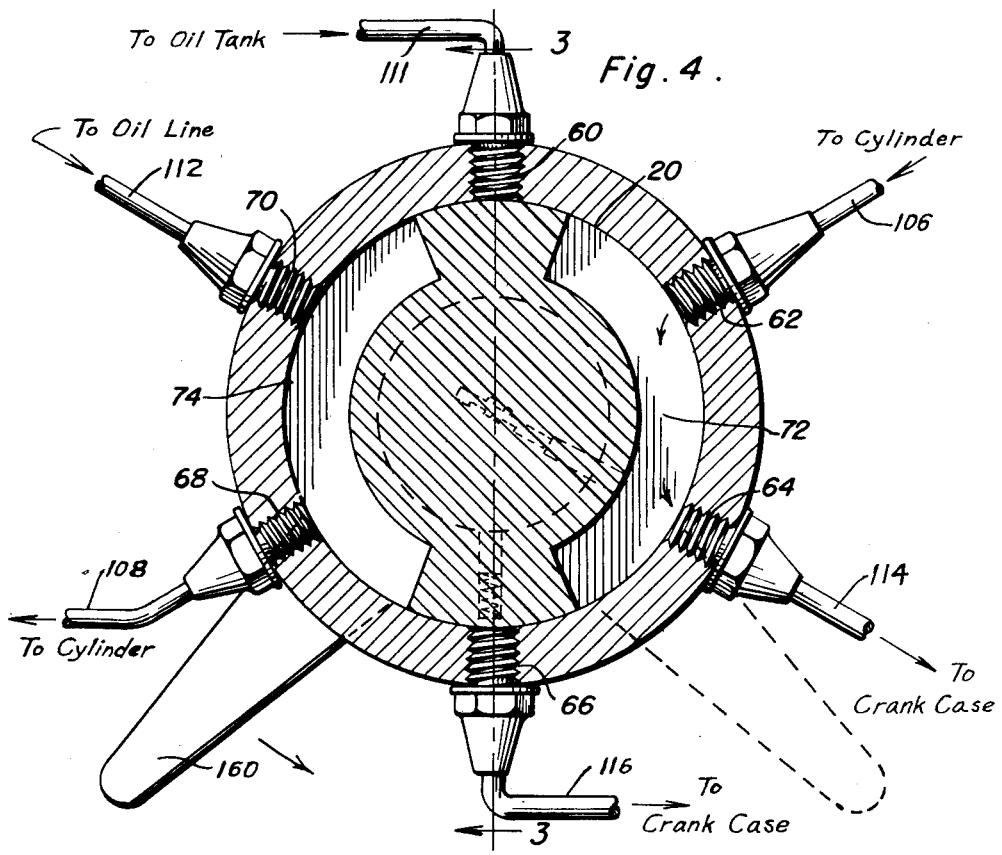
Figure 4 is a transverse vertical sectional view taken substantially on the plane of section line 4—4 of Figure 3.
Figure 5:
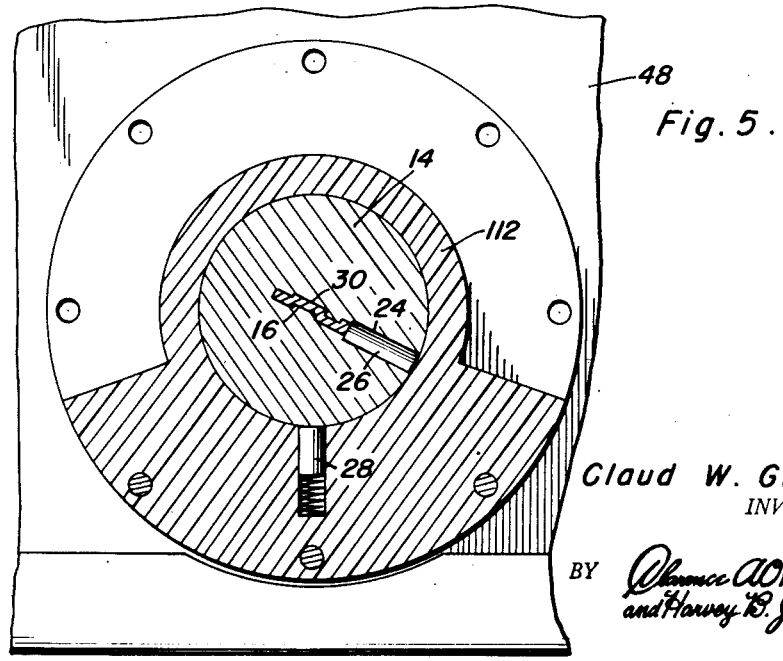
Figure 5 is a transverse vertical sectional view taken substantially on the plane of section line 5—5 of Figure 3.

The valve 20 is provided with diametrically opposed arcuate recesses or notches 72 and 74 so that when the barrel 14 is rotated to a position for closing the switch 44, by the proper key 30, the ports 62 and 64 will be in communication through the recess 72 and the ports 68 and 70 will be in communication through the recess 74, see Figure 4. However, when the barrel 14 is disposed in its normally locked position, see Figure 6, the switch 44 is open and the ports 60, 62 and 70 are in communication through the notch 72, and the ports 64, 66 and 68 are in communication through the recess 74.

Secured relative to a portion of the vehicle power plant 76, by any suitable means such as a bracket or the like, (not shown) is a cylinder 78 having removable end walls or closures 80 that are centrally apertured to slidably receive a piston rod 82 one end, 84, of which is coupled as at 86 to the brake operating rod 88 of a master brake cylinder 90 having brake lines 92 that extend to the wheel brake lines 94 of a vehicle.

The cylinder 78 is provided adjacent one of its ends with longitudinally spaced ports 102 and 104 which are respectively connected to the ports 62 and 68 of the housing 10 by conduits 106 and 108.

Extending from the port 60 of the housing 10 and leading to an oil tank 109, suitably mounted on the vehicle, is an oil supply conduit 111 that will deliver oil from the tank 109 to the housing 10 and hence to the cylinder 78 by way of conduit 106, when the power plant is in an inoperative position and the ignition switch 64 is turned to an "off" position.

The port 70 is connected by a conduit 112 to the oil line 110 of the power plant 76 to supply oil to the port 102 when the ignition switch is "off" and to the port 104 when the power plant is running and the ignition switch is "on." The line 110 is provided with a check valve 174 and a suitable relief valve 175.

Figure 6:
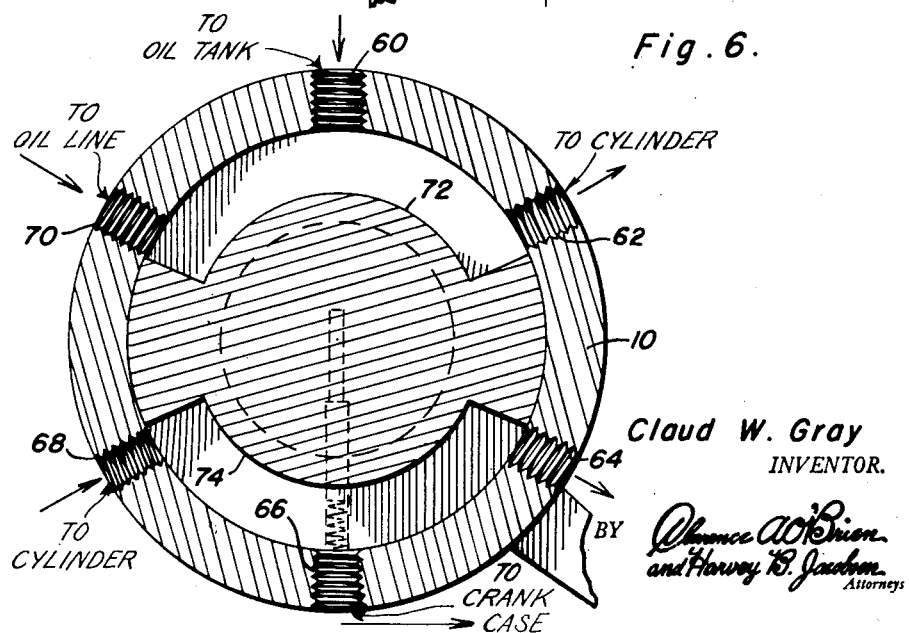
Figure 6 is a view similar to Figure 4 and showing the barrel rotated to an unlocked position for operating the mechanical brake for the vehicle drive shaft.

Branch conduits 114 and 116 extend from the ports 64 and 66 and are connected together and to the crank case 120 of the power plant to return oil leaving the cylinder 78 to the crank case 120 when the valve 20 is in the position shown in Figure 6.

The cylinder 78 is provided with a vacuum port 113 from which there extends a conduit 115 that leads to the manifold 117 of the power plant 76 so that when the power plant is operating and of course, the ignition switch is "on," a vacuum will prevail in the conduit 115 to permit the rod 88 to be urged to its brake releasing position. The cylinder 78 is divided into two compartments by a partition 79 and pistons 81 and 83 fixed to the rod 82 are disposed in the cylinder 78 on opposite sides of the partition 79. The port 113 communicates with one compartment and the ports 104 and 102 communicate with the other compartment, as shown best in Figure 11 of the drawings. A spring 100 is biased between the partition 79 and the piston 83 to aid in urging the rod 82 to its brake-releasing position.

It should be noted, that the tank 109 communicates with the oil line of the vehicle and that the same will receive and retain oil under pressure therein to be supplied to the cylinder 78 under conditions presently to be described.

A brake wheel 124 is suitably secured to the driving shaft 126 of the power plant 76 and this brake wheel is embraced by a split brake band 128 the inner periphery of which supports brake linings 130 for bearing against the outer periphery of the wheel 124 when the band 128 is contracted.

Angle members 132 and 134 are fixed to the spaced ends of the band 128 and are connected by a suitable bolt 136 having an eye end 138 that is pivoted to a cam 140.

A coil spring 142 embraces the bolt 136 and is positioned between the angle members 132 and 134 to normally urge the same spaced relative to each other, and a further resilient member or coil spring 144 embraces the bolt 136 and is biased between one of the angle members, for example member 134, and a washer 146 carried by the bolt 136 for normally urging the bolt in one direction with the cam 140 against the angle member 132.

A bracket 148 mounted on the power plant 76 supports a pivotal link 150 having one end pivoted to the end 152 of the piston rod 82 and its remaining end pivoted to a link or pitman 154.

The pitman 154 is pivoted to an arm or lever 156 that is fixed to the cam 140 so that as the rod 82 is moved in one direction and to a braking position, the cam 140 will force the angle members toward each other contracting the brake band and forcing the brake lining against the brake wheel to prevent rotation of the drive shaft 126.

An arcuate slot 158 is provided in the housing 10 and slidably receives an arm or lug 160 that is fixed to the inner end of the barrel 14 and which is used for rotating the barrel.

In practical use of the present invention, as illustrated in Figures 1–11, inclusive, when the ignition switch is "on," the valve 20 is disposed in its position shown in Figure 4 so that oil in the line 110 will enter the line 112 and hence pass into the housing 10 through port 70. The oil thus entering the housing 10 will follow the recess 74 in the valve 20 and will exit from the housing through port 68, whereupon the oil will enter the conduit 108 to force the piston 81 and piston rod 82 to a position for releasing the brakes, that is, moving the brake rod 88 to the right, as shown in Figure 11.

Also, with the valve 20 in its position as shown in Figure 4, a vacuum or suction will prevail in the conduit 115 so that the piston rod 82 can move without restriction from air in the cylinder 78 between the wall 80 and the piston 83.

The coil spring 100 cooperates with the fluid entering the cylinder 78 through the port 104 in order to urge the rod 82 to its brake-releasing position.

When the valve 20 is rotated to its position shown in Figure 6 and the ignition switch is "off," oil under pressure in the tank 109 will enter the conduit 111 and then enter the housing 10 through the port 60. The oil will then follow recess 72 and will exit from the housing 10 by way of port 62 and conduit 106, whereupon the oil will enter the port 102 in the cylinder 78 to move the piston rod 82 to the left, as shown in Figure 11, and to its brake-applying position. Oil will exit from the cylinder by passing through line 108, recess 74 and into the line 114 where the oil will pass into the crank case as shown in Figure 6.

Should the foot pedal 170 be depressed, while the vehicle is in operation, the fluid entering the cylinder 78 through conduit 108 will be forced by piston 81 out of the cylinder 78 and into the conduit 109, since the piston rod 82 will be moved to the left (see Figure 11).

Reference is now directed to Figures 12 and 13, wherein there is disclosed the present invention in slightly modified form. In this embodiment, a piston rod 161 is pivoted to a lever or link 162 which in turn is pivoted to the brake rod 88'.

A bracket 164 suitably mounted on a part of the vehicle, pivotally supports the lever 162 and includes an angulated portion 166 that slidably receives a pitman 168 which is pivoted at one end to the brake rod 88'. The free end of the pitman 168 is pivotally and slidably secured to a foot operated brake lever 170 which, when moved in the direction of arrow A will cause the lower end of the lever 170 to move in the direction of arrow B for applying the brake.

A coil spring 172 embraces the pitman 168 and is biased between the link 162 and portion 166 to retain the pitman in its neutral position or a position between its brake-applying and brake-releasing positions.

In this latest embodiment, the cylinder 78 is replaced by a further cylinder 176 having end walls 178 and 180. The end wall 178 is provided with a port 182 that receives one end of a conduit 108a. The cylinder 176 is provided with a further port 183 that receives a conduit 106a, and a still further port 184 that receives a conduit 115a that extends through the manifold of the vehicle.

A guide and partition 186, fixed within the cylinder intermediate the ends thereof, slidably supports the rod 161 and a spring 188 embraces the rod 161 and is biased between the guide 186 and an auxiliary piston 190 fixed on the rod 161. The spring 188 aids in urging the rod 161 to a brake-releasing position.

A housing 10a is provided with circumferentially spaced ports 60a, 62a, 64a, 66a, 68a and 70a. The port 60a is connected to a conduit 111a leading from a supply tank 109a; the port 62a is connected to the conduit 106a leading to the port 183 of the cylinder 176; the port 64a is connected to a branch conduit 114a of a conduit 116a that extends from the port 66a to the crank case of the power plant; the port 68a is connected to the conduit 108a that extends from the port 182 of the end wall 178; and the port 70a is connected to a conduit 110a that extends to the oil line of the vehicle.

A valve is mounted for rotation in the housing 10a and includes diametrically opposed recesses 72a and 74a. When the valve is rotated so that the same is disposed in the position shown in Figure 12, oil pumped through the conduit 110a will enter the conduit 108a to enter the right end of the cylinder 176, thereby moving the rod 161 to its brake-releasing position until a foot pressure is applied to the pedal 170. Also, any oil trapped between the piston 192 and partition 186 will be forced through the conduits 106a, 114a, and 116a to the crank case of the vehicle. The spring 188, compressed between the piston 190 and the partition 186, will aid in urging the rod 161 to its brake-releasing position. Furthermore, since the power plant is in operation, a suction will be present in the left end of the cylinder 176 and conduit 115a to aid in urging the pistons 190 and 192 also rod 161 to the left.

Upon a manual rotation of the valve to its position shown in Figure 13, oil under pressure in the tank 109a will pass through the conduits 111a and 106a to enter the cylinder 176 in order to move the piston 192 and rod 161 to the right or to a brake-applying position, and oil trapped between the piston 192 and end wall 178 will be forced through the conduits 108a, 114a and 116a to the crank case.

Although illustrated and described in the above, the brake operating rods (82 and 161) are actuated by a liquid (oil) from the power plant, obviously other sources could be utilized for supplying a liquid or fluid under pressure to the cylinders (78 or 176).

Obviously, in the embodiment illustrated in Figures 1–11 inclusive, by regulating the flow of fluid under pressure in the conduit 110 leading directly from the power plant to the cylinder 78, a sufficient pressure may be maintained in order to urge the brake rod to its brake releasing position without the necessity of having to provide a vacuum conduit and a spring member. However, by so including the vacuum and spring member the necessary pressure in the conduit 108 may be maintained in a relatively low range.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In combination with a motor vehicle including an ignition circuit and a brake system, said brake system being provided with a master cylinder having a manually operated brake rod, a second cylinder in which the brake rod is slidably mounted, a piston working in the second cylinder and connected to the brake rod, spring means moving the piston and the brake rod into brake releasing position, and fluid pressure generating means operated by the power plant of the vehicle and operably connected to the second cylinder and causing pressure to act on the piston to hold the brake rod in a brake releasing position, said fluid pressure means including an ignition key controlled valve controlling operation of said pressure means, a rotor movable with said valve, and an ignition switch operated by said rotor and connected to the circuit.

2. In a vehicle having an ignition circuit, a brake system and a main drive shaft, said brake system being provided with a master cylinder having a manually operated brake rod, a mechanical brake for the main drive shaft connected to and operated by the brake rod, a fluid pressure means operated by the power plant of the vehicle for supplying fluid pressure for urging the brake rod and the mechanical brake into brake applying position as a unit, further fluid pressure operated means for moving the brake rod and the mechanical brake to brake releasing position as a unit, and an ignition switch connected to the circuit and including a key operated valve for controlling both of said fluid pressure operated means and for selectively controlling the flow of fluid to said first fluid pressure operated means and said further fluid pressure operated means.

3. In a motor vehicle having an ignition circuit and a brake system provided with a master cylinder having a manually operated brake rod, a second cylinder in which the brake rod is slidably mounted, a piston working in the cylinder and connected to the brake rod, a fluid pressure generating means operated by the power plant of the vehicle and connected to the second cylinder for moving the piston within the second cylinder and the brake rod to a brake releasing position, a fluid pressure source connected to said second cylinder for moving the piston within the second cylinder and the brake rod to a brake applying position when the power plant is idle, an ignition switch connected to the circuit and including a key operated valve for selectively controlling the flow of fluid under pressure into the second cylinder by way of said fluid pressure generating means and said fluid pressure source.

4. The combination of claim 3 and a spring received in said second cylinder and yieldingly urging said piston and said brake rod to a brake releasing position.

5. In a vehicle having an engine with an intake manifold, an oil line, an ignition circuit and a brake system, said brake system including a master cylinder provided with a manually operated brake rod, a second cylinder in which the brake rod is slidably mounted, a partition mounted in said second cylinder and dividing the second cylinder into forward and rear compartments, a forward piston mounted in said forward compartment and connected to said brake rod, a rear piston mounted in said rear compartment and connected to said brake rod, a conduit between the oil line of the vehicle and the rear compartment of said second cylinder for supplying oil under pressure to the rear compatrment to move the pistons forwardly in the second cylinder and the brake rod to a brake releasing position, a fluid pressure source operatively connected to the rear compartment for moving the pistons rearwardly in the second cylinder and the brake rod to a brake applying position, a pipe connecting the forward compartment to the intake manifold of the engine whereby vacuum in said mainfold will aid in retaining the brake rod in its brake releasing position, and a key operated ignition switch including a valve for said conduit and said fluid pressure source.

6. The combination of claim 5 and a mechanical brake for the drive shaft of the vehicle, and linkage connecting said mechanical brake to said brake rod, said linkage being actuated for moving the mechanical brake to a brake applying position upon movement of said brake rod to a brake applying position.

7. In combination with the brake system and main drive shaft of a vehicle, said brake system including a master cylinder having a manually operated brake rod, a mechanical brake for said drive shaft connected to and operated by the brake rod, a fluid pressure operated means operatively connected to the brake rod and to the mechanical brake for urging the brake rod and the mechanical brake into brake applying position, a fluid pressure source, and a key operated valve controlling the flow of fluid from said fluid pressure source and manually operable for selectively urging the brake rod and the mechanical brake into brake applying position and for releasing the same.

8. In a vehicle having an ignition circuit, a power plant and a brake system including a master cylinder provided with a brake rod; a device for retaining the brakes of a vehicle in a brake applying position when the power plant of the vehicle is not in operation, said device comprising a second cylinder having forward and rear compartments, an operating rod slidably carried by the second cylinder within both compartments and connected to the brake rod, a forward piston on the operating rod and disposed in the forward compartment, a rear piston fixed on the operating rod and positioned in the rear compartment, a fluid pressure generating means operatively connected to the rear compartment for urging the pistons and the operating rod to brake releasing position, a fluid pressure source connected to the forward compartment for directing fluid under pressure into the cylinder to move the pistons and the operating rod to brake applying position, a switch for the ignition circuit and a valve operatively connected to the switch and operatively connected to said pressure generating means and said fluid pressure source for selectively actuating said fluid pressure generating means and said fluid pressure source, said fluid pressure source being active upon movement of the ignition switch to its circuit open position and said fluid pressure generating means being active upon movement of the switch to its circuit closing position.

9. In a motor vehicle having a power plant, a master brake cylinder provided with a brake rod, an intake manifold, an oil line and a crank case; a device for retaining the brakes of a vehicle applied when the power plant of the vehicle is not in operation, said device comprising a second cylinder divided into first and second compartments, an operating rod slidably received in both compartments and operatively connected to the brake rod, a first piston on the operating rod and disposed in the first compartment, a second piston on the operating rod received in the second compartment, a valve housing having a plurality of circumferentially spaced ports including first, second, third, fourth, fifth, and sixth ports, said first and fourth ports being connected to the first compartment, said second and third ports being connected to the crank case, said fifth port being connected to the oil line, a fluid pressure source connected to the sixth port, said second compartment being connected to the intake manifold, and a key operated valve in the housing and having a pair of diametrically opposed slots therein that extend between the first and second ports and the fourth and fifth ports, respectively, when the power plant is in operation to hold the operating rod and the brake rod in brake releasing position, said slots extending between said first, fifth and sixth ports and said second, third and fourth ports, respectively, to form a communication between said fluid pressure source and said second cylinder thereby permitting the fluid pressure source to urge the rod to its brake applying position when the power plant of the vehicle is not in operation.

10. In a vehicle having a master brake cylinder provided with a brake rod and an ignition system; a device for retaining the brake rod in its brake applying position when the ignition system is open, said device comprising a second cylinder having first and second compartments, an operating rod slidably received by the cylinder in both compartments and connected to the brake rod for selectively urging the brake rod to its brake applying and brake releasing positions, a first piston on the operating rod and disposed within the first compartment, a second piston on the operating rod and disposed within the second compartment, fluid pressure means operatively connected to the compartments of the second cylinder for selectively moving the operating rod and brake rod to brake applying and brake releasing positions, and an ignition switch operatively connected to the ignition circuit and including a key operated valve operatively connected to said fluid pressure means to permit actuation of the fluid pressure means to move the brake rod to a brake releasing or brake applying position.

11. In a vehicle having a master brake cylinder provided with a brake rod, an oil line and an intake manifold, a braking apparatus comprising a pneumatically actuated second cylinder connected to and in communication with the intake manifold and including an operating rod attached to the brake rod and selectively movable to brake applying and brake releasing positions, a conduit means operatively connecting the second cylinder to the oil line to urge the operating rod to its brake releasing position during operation of the power plant of the vehicle, a fluid pressure source operatively connected to and in communication with the second cylinder for moving the operating rod to its brake applying position, and a valve for actuating said fluid pressure means and for selectively opening and closing said conduit means.

12. In a vehicle having a brake cylinder provided with a brake rod, an oil line and an intake manifold, a braking apparatus comprising a pneumatically actuated second cylinder operatively connected to the manifold and including an operating rod attached to the brake rod and selectively movable to brake applying and brake releasing positions, conduit means operatively connecting the second cylinder to the oil line to urge the operating rod to its brake releasing position during operation of the power plant of the vehicle, a tank containing fluid under pressure operatively connected to said second cylinder for moving the operating rod to a brake applying position, and valve means connected to said tank and said conduit means for selectively admitting fluids into the second cylinder from said conduit means and said tank.

13. In a vehicle having a power plant, a master cylinder provided with a brake rod, an oil line and an intake manifold, a braking apparatus comprising a pneumatically actuated second cylinder including an operating rod connected to the brake rod and selectively movable to brake applying and brake releasing positions, conduit means operatively connecting the second cylinder to the oil line and to the intake manifold to urge the operating rod to brake releasing position during operation of the power plant of the vehicle, valve means controlling the flow of fluid under pressure from the oil line into the second cylinder and a tank containing fluid under pressure operatively connected to the second cylinder and having a conduit means selectively opened and closed by said valve means, said tank being in communication with said second cylinder to move the operating rod to brake applying position when the conduit means to said oil line is closed by said valve means.

14. In a vehicle having an ignition circuit, a brake system provided with a brake rod, an oil line and an intake manifold, fluid pressure means connected to the oil line and to the intake manifold and also connected to the brake rod for urging the brake rod to a brake releasing position, a fluid pressure source operatively connected to the fluid pressure means for moving the latter to a brake applying position, and an ignition switch operatively connected to the circuit and including a key operated valve for selectively admitting fluid under pressure into said fluid pressure means from said oil line and said fluid pressure source.

15. In a motor vehicle including an ignition circuit, an oil line and an intake manifold, a brake actuator comprising a fluid pressure member operatively connected to the oil line and the intake manifold to be urged to a brake releasing position, a fluid pressure source operatively connected to the member for moving the member to a brake applying position, and an ignition switch connected to the circuit and including a key operated valve operatively connected to the member for selectively admitting fluid under pressure into said fluid pressure member from said fluid pressure source and said oil line, said switch being moved to its circuit open position to open the valve between the fluid pressure member and the fluid pressure source.

CLAUD W. GRAY.

References Cited in the file of this patent

UNITED STATES PATENTS

| Number | Name | Date |
| --- | --- | --- |
| 1,781,869 | Bragg et al. | Nov. 18, 1930 |
| 2,056,942 | Krueger | Oct. 13, 1936 |
| 2,318,756 | Chouings | May 11, 1945 |

FOREIGN PATENTS

| Number | Country | Date |
| --- | --- | --- |
| 462,449 | Germany | July 12, 1928 |